(12) United States Patent
Long et al.

(10) Patent No.: US 10,987,747 B2
(45) Date of Patent: Apr. 27, 2021

(54) BRAZING MATERIAL OUTER COAT AND PREPARATION METHOD THEREOF, IN-SITU SYNTHETIC METAL-COATED FLUX-CORED SILVER BRAZING MATERIAL, PREPARATION METHOD THEREOF, WELDING METHOD AND JOINT BODY

(71) Applicant: Zhengzhou Research Institute of Mechanical Engineering Co., Ltd., Henan (CN)

(72) Inventors: Weimin Long, Zhengzhou (CN); Sujuan Zhong, Zhengzhou (CN); Quanbin Lu, Zhengzhou (CN); Yinyin Pei, Zhengzhou (CN); Peng He, Zhengzhou (CN); Dezhi Wang, Zhengzhou (CN); Jia Ma, Zhengzhou (CN); Huawei Sun, Zhengzhou (CN); Yongtao Jiu, Zhengzhou (CN); Qi Wang, Zhengzhou (CN)

(73) Assignee: ZHENGZHOU RESEARCH INSTITUTE OF MECHANICAL ENGINEERING CO., LTD., Henan (CN)

( * ) Notice: Subject to any disclaimer, the term of this patent is extended or adjusted under 35 U.S.C. 154(b) by 327 days.

(21) Appl. No.: 16/073,537

(22) PCT Filed: Dec. 19, 2017

(86) PCT No.: PCT/CN2017/117295
§ 371 (c)(1),
(2) Date: Aug. 24, 2018

(87) PCT Pub. No.: WO2019/119281
PCT Pub. Date: Jun. 27, 2019

(65) Prior Publication Data
US 2020/0261995 A1    Aug. 20, 2020

(51) Int. Cl.
*B23K 35/00* (2006.01)
*B23K 1/20* (2006.01)
(Continued)

(52) U.S. Cl.
CPC .......... *B23K 1/203* (2013.01); *B23K 35/0227* (2013.01); *B23K 35/0233* (2013.01);
(Continued)

(58) Field of Classification Search
CPC ................ B23K 1/203; B23K 35/0227; B23K 35/0233; B23K 35/302; B23K 35/362;
(Continued)

(56) References Cited

U.S. PATENT DOCUMENTS

| 2013/0248586 A1* | 9/2013 | Harris ............... B23K 1/203 228/244 |
| 2014/0030139 A1* | 1/2014 | Cho ................. C22C 9/00 420/482 |

(Continued)

*Primary Examiner* — Kiley S Stoner
(74) *Attorney, Agent, or Firm* — Mai-Tram D. Lauer; Westman, Champlin & Koehler, P.A.

(57) ABSTRACT

A brazing material outer coat and a method for preparing the same, an in-situ synthetic metal-coated flux-cored silver brazing material and a method for preparing the same, a welding method and a joint body, wherein the in-situ synthetic metal-coated flux-cored silver brazing material comprises a flux core and a brazing material outer coat wrapping the flux core, the brazing material outer coat comprises, in percentage by weight: silver Ag 20.0~36.0%, copper Cu 35.0~45.0%, zinc Zn 27.0~37.0%, tin Sn 1.0~3.0%, phosphorus P 0.1%~0.5%, nickel Ni 0.5~2.0%, germanium Ge 0.1~0.3%, and lithium Li 0.1~0.3%, the flux core comprises, in percentage by weight: elemental boron micropowder 5.0~10.0%, sodium borohydride 5.0~10.0%, potassium fluoroborate 15.0~30.0%, boric anhydride 25.0~40.0%, sodium fluoride 10.0~30.0%, sodium bifluoride 2.0~4.0%, and copper sulfate 1.0~5.0%. The in-situ synthetic metal-
(Continued)

coated flux-cored silver brazing material in the present disclosure realizes self-reaction in a brazing process to coat a layer of copper film on a surface of a brazed metal, the core of the brazing material has good wettability, good flowability, self-brazing function, and zinc being hard to volatilize, the flux coat has high activity, low hygroscopicity, few carbon residues, good plasticity and toughness, etc. The present disclosure is particularly suitable for brazing pipeline components of stainless steel, manganese brass and so on.

16 Claims, 1 Drawing Sheet

(51) Int. Cl.
  *B23K 35/02* (2006.01)
  *B23K 35/30* (2006.01)
  *B23K 35/362* (2006.01)
  *B23K 101/32* (2006.01)
  *B23K 103/12* (2006.01)
  *B23K 101/06* (2006.01)
(52) U.S. Cl.
  CPC .......... *B23K 35/302* (2013.01); *B23K 35/362* (2013.01); *B23K 2101/06* (2018.08); *B23K 2101/32* (2018.08); *B23K 2103/12* (2018.08)
(58) Field of Classification Search
  CPC ............ B23K 2101/32; B23K 2103/12; B23K 2101/06; B23K 35/24; B23K 35/40
  See application file for complete search history.

(56) References Cited

U.S. PATENT DOCUMENTS

2016/0158898 A1* 6/2016 Wiehl ................ B23K 35/3006
  148/528
2017/0368641 A1* 12/2017 Wiehl ................... B23K 1/203

* cited by examiner

BRAZING MATERIAL OUTER COAT AND PREPARATION METHOD THEREOF, IN-SITU SYNTHETIC METAL-COATED FLUX-CORED SILVER BRAZING MATERIAL, PREPARATION METHOD THEREOF, WELDING METHOD AND JOINT BODY

CROSS-REFERENCE TO RELATED APPLICATION

This Application is a Section 371 National Stage Application of International Application No. PCT/CN2017/117295, filed Dec. 19, 2017, the contents of which are hereby incorporated by reference in their entirety.

TECHNICAL FIELD

The present disclosure relates to the technical field of welding materials, particularly to a brazing material outer coat and a method for preparing the same, an in-situ synthetic metal-coated flux-cored silver brazing material and a method for preparing the same, a welding method and a joint body.

BACKGROUND ART

Currently, with development of high-frequency induction welders, application of the induction brazing technology in connection of pipelines is booming. Induction brazing is simple and convenient in operation, relatively uniform in heating, and good in economy, and it does not need to heat a whole part, and allows rapid local heating, thus connecting high-strength elements with the minimum strength loss. In order to save the brazing material and produce a joint of stable quality, and control a usage amount of the brazing material, pre-molded brazing materials are used more and more (the pre-molded brazing material refers to a brazing material customized to have a certain form according to a form of a weld). A commonest form is a ring shape.

Brazing material rings of a composite type of brazing material and flux used in the brazing of pipelines include flux-cored brazing material rings and flux-coated brazing material rings. At present, the flux-cored brazing material rings have the following defects: a flux of a core of a flux-cored silver brazing material usually contains boric anhydride, potassium fluoride, potassium bifluoride and other inorganic matter, and thus easily absorbs moisture, and a flux layer which has absorbed moisture is corrosive, and seriously corrodes a brazing material outer coat wrapping the flux of the core, then the brazing material outer coat easily "rusts" due to the corrosion, and the brazing material outer coat having "rusted" seriously affects operational performances and storage stability of the flux-cored silver brazing material.

In order to prevent the flux of the core from corroding the brazing material outer coat, a flux having low activity has to be used (the flux mainly serves functions of removing an oxidation film on a surface of a welded metal and protecting the welded metal against oxidation, and the activity of the flux mainly refers to capability of removing the oxidation film). When a stainless steel and manganese brass are brazed, $Cr_2O_3$, $TiO_2$, and $MnO_2$ on surfaces are relatively stable, and difficult to remove, seriously affecting brazing reliability of the flux-cored silver brazing material. Currently, in engineering, a layer of copper or nickel is plated on a surface of metals that are hard to braze for improving brazability thereof, but regardless of electroplating or chemical plating, one procedure is added, then an operation is complex, a cost is also correspondingly increased, and serious pollution to environment is caused.

SUMMARY

An object of the present disclosure is to provide a brazing material outer coat and a method for preparing the same, an in-situ synthetic metal-coated flux-cored silver brazing material and a method for preparing the same, a welding method and a joint body, so as to improve the storage stability and the welding reliability.

Following technical solutions are used in the present disclosure for solving the technical problems thereof.

A brazing material outer coat includes, in percentage by weight:

silver Ag 20.0~36.0%, copper Cu 35.0~45.0%, zinc Zn 27.0~37.0%, tin Sn 1.0~3.0%, phosphorus P 0.1%~0.5%, nickel Ni 0.5~2.0%, germanium Ge 0.1~0.3%, and lithium Li 0.1~0.3%.

Furthermore, the brazing material outer coat includes, in percentage by weight:

silver Ag 25~35%, copper Cu 35.0~40.0%, zinc Zn 27.0~37.0%, tin Sn 1.5~3.0%, phosphorus P 0.1%~0.4%, nickel Ni 1.0~1.5%, germanium Ge 0.15~0.2%, and lithium Li 0.15~0.2%.

A method for preparing a brazing material outer coat includes smelting and pouring various metal elements of the brazing material outer coat into an ingot, and after preheating the ingot in a temperature condition of 300~550° C., processing and molding the ingot.

An in-situ synthetic metal-coated flux-cored silver brazing material includes a flux core and a brazing material outer coat wrapping the flux core, wherein the brazing material outer coat includes, in percentage by weight:

silver Ag 20.0~36.0%, copper Cu 35.0~45.0%, zinc Zn 27.0~37.0%, tin Sn 1.0~3.0%, phosphorus P 0.1%~0.5%, nickel Ni 0.5~2.0%, germanium Ge 0.1~0.3%, and lithium Li 0.1~0.3%.

The flux core includes, in percentage by weight:

elemental boron micropowder 5.0~10.0%, sodium borohydride 5.0~10.0%, potassium fluoroborate 15.0~30.0%, boric anhydride 25.0~40.0%, sodium fluoride 10.0~30.0%, sodium bifluoride 2.0~4.0%, and copper sulfate 1.0~5.0%.

Furthermore, the brazing material outer coat includes, in percentage by weight:

silver Ag 25~35%, copper Cu 35.0~40.0%, zinc Zn 27.0~37.0%, tin Sn 1.5~3.0%, phosphorus P 0.1%~0.4%, nickel Ni 1.0~1.5%, germanium Ge 0.15~0.2%, and lithium Li 0.15~0.2%.

Furthermore, the in-situ synthetic metal-coated flux-cored silver brazing material further includes a protection layer formed on an inner surface of the brazing material outer coat.

Furthermore, the protection layer is a metal coating that has a melting point lower than that of the brazing material outer coat and that is waterproof.

Furthermore, the protection layer is a tin layer or an indium layer.

Furthermore, the protection layer has a thickness of 0.001~0.08 mm.

Furthermore, the in-situ synthetic metal-coated flux-cored silver brazing material is in an axially multi-turn spring-shaped structure.

A method for preparing an in-situ synthetic metal-coated flux-cored silver brazing material of the present disclosure includes:

smelting and pouring various metal elements of a brazing material outer coat into an ingot, and after pre-heating the ingot in a temperature condition of 300~550° C., processing the ingot into a brazing material tube;

filling the dried and smashed flux core into the brazing material tube.

Furthermore, before being filled with the flux core, the brazing material tube undergoes a passivation treatment.

Furthermore, the ingot is firstly processed into a strip-shaped alloy after being pre-heated, the strip-shaped alloy undergoes the passivation treatment after a surface cleaning treatment, then the passivated strip-shaped alloy is oven dried to be processed into the brazing material tube; preferably, the surface cleaning treatment includes acid pickling and ultrasonic water washing; preferably, the drying is carried out under a temperature of 100~150° C. for a period of 5~10 min.

Furthermore, before being processed into the brazing material tube, the strip-shaped alloy is coated with the protection layer on one surface, then the strip-shaped alloy is wound into the brazing material tube, with the protection layer being located on the inner surface of the brazing material tube; preferably, the protection layer is a metal coating that has a melting point lower than that of the brazing material outer coat and that is waterproof; preferably, the protection layer is a tin layer or an indium layer; preferably, the protection layer is formed on one surface of the strip-shaped alloy in a spray coating way.

Furthermore, the flux core is dried under 100-120° C. for 240 min or more.

A brazing method using the in-situ synthetic metal-coated flux-cored silver brazing material of the present disclosure is provided. Furthermore, the brazing is at least one selected from the group consisting of flame brazing, induction brazing, and resistance brazing.

Furthermore, the brazing method includes a step of joining an installing object and a to-be-installed object into one piece using the in-situ synthetic metal-coated flux-cored silver brazing material of the present disclosure; at least one of the installing object and the to-be-installed object is a stainless steel or manganese brass pipeline component to be brazed.

A joint body is provided, which uses the in-situ synthetic metal-coated flux-cored silver brazing material of the present disclosure, such that an installing object and a to-be-installed object are joined into one piece.

Furthermore, at least one of the installing object and the to-be-installed object is a stainless steel or manganese brass pipeline component to be brazed.

Compared with the prior art, the present disclosure has following advantages:

The in-situ synthetic metal-coated flux-cored silver brazing material prepared in the present disclosure realizes self-reaction in a brazing process to coat a layer of copper film on a surface of a brazed metal, the core of the brazing material has good wettability, good flowability, self-brazing function, and zinc being hard to volatilize, the flux coat has high activity, low hygroscopicity, few carbon residues, good plasticity and toughness, etc. The present disclosure is particularly suitable for brazing pipeline components of stainless steel, manganese brass and so on.

Furthermore, when the flux-cored silver brazing material of the present disclosure is used for brazing stainless steel, the brazing efficiency is greatly improved, and an operation of plating a nickel layer on the surface of the stainless steel is avoided, thus saving the cost and time.

Figure 1:
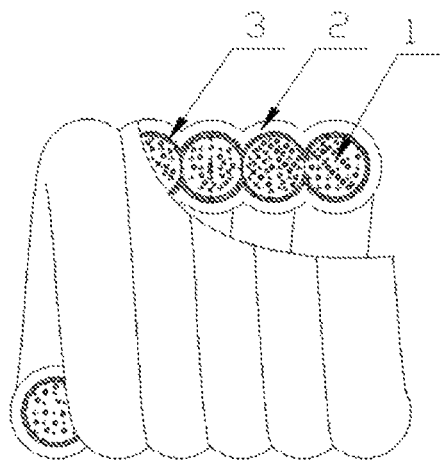
FIG. 1 is a schematic structural diagram of a multi-turn spring-shaped flux-cored silver brazing material.

In the drawings: 1—flux core, 2—brazing material outer coat, 3—protection layer.

DETAILED DESCRIPTION OF EMBODIMENTS

In the description of the present disclosure, it also should be indicated that unless otherwise specified and defined explicitly, terms "provide", "mount", "link", and "connect" should be construed in a broad sense. For example, it can be fixed connection, detachable connection, or integrated connection; it can be direct connection, indirect connection through an intermediate medium, or inner communication between two elements. For a person ordinarily skilled in the art, specific meanings of the above-mentioned terms in the present disclosure can be understood according to specific circumstances.

Below the present disclosure is further described in combination with the accompanying drawings and examples.

Figure 2:
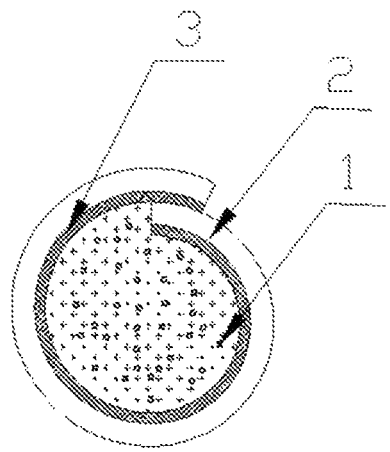
FIG. 2 is a schematic structural diagram of a cross section of a flux-cored silver brazing material wire.

As shown in FIG. 1 and FIG. 2, the present embodiment provides an in-situ synthetic metal-coated flux-cored silver brazing material, including a flux core 1 and a brazing material outer coat 2 wrapping the flux core.

In the above, the brazing material outer coat includes, in percentage by weight:

silver Ag 20.0~36.0%, copper Cu 35.0~45.0%, zinc Zn 27.0~37.0%, tin Sn 1.0~3.0%, phosphorus P 0.1~0.5%, nickel Ni 0.5~2.0%, germanium Ge 0.1~0.3%, and lithium Li 0.1~0.3%.

Furthermore, the brazing material outer coat includes, in percentage by weight:

silver Ag 25~35%, copper Cu 35.0~40.0%, zinc Zn 27.0~37.0%, tin Sn 1.5~3.0%, phosphorus P 0.1~0.4%, nickel Ni 1.0~1.5%, germanium Ge 0.15~0.2%, and lithium Li 0.15~0.2%.

The flux core includes, in percentage by weight:

elemental boron micropowder 5.0~10.0%, sodium borohydride 5.0~10.0%, potassium fluoroborate 15.0~30.0%, boric anhydride 25.0~40.0%, sodium fluoride 10.0~30.0%, sodium bifluoride 2.0~4.0%, and copper sulfate 1.0~5.0%.

In the present disclosure, tin Sn, phosphorus P, nickel Ni, germanium Ge, and lithium Li are added on the basis of the conventional silver brazing material. The several metals added cooperate with each other, which, on one hand, can improve the storage reliability of the flux-cored silver brazing material, and on the other hand, can improve the soldering reliability.

Adding a small amount of phosphorus to the brazing material outer coat can lower the melting point of the brazing material, and improve the flowability of the brazing material.

Adding nickel to the brazing material outer coat can improve the reliability after the brazing, for example, the strength of a stainless steel joint can be improved.

Adding a small amount of lithium renders a self-brazing function, for example, when a to-be-brazed metal is stainless steel, lithium can be oxidized into lithium oxide, meanwhile, the lithium oxide can form a complex compound having a low melting point (for example, $Li_2CrO_4$ is a substance with a low melting point, which has a melting point of about 520° C.) with chromium oxide on the surface of the stainless steel Besides, lithium oxide can react with surrounding vapor to form a compound LiOH having a low melting point (the melting point is about 450° C.), liquid lithium hydroxide can dissolve an oxidation film on a surface of the to-be-brazed metal that is hard to be removed by the flux, meanwhile, the lithium hydroxide covers the surface of the brazed metal in a form of liquid film, and can protect the brazed metal against oxidation. Besides, as a surface active substance, lithium can improve the wettability of the flux core, and has a relatively high solid solubility in the silver brazing material, thus an intermetallic compound is not easily formed.

If a content of lithium is too low, the self-brazing effect will be weakened and even disappear, and the surface activity will be deteriorated, and if the content of lithium is too high, brittleness of the brazing material outer coat will be increased, causing it impossible to implement mechanical processing.

Furthermore, the brazing material outer coat further includes silicon Si 0.1~0.5% in percentage by weight.

Zinc volatilizes in brazing, such that the melting point of the brazing material is raised, and pores are created in a joint, which destroy compactness of a brazing seam; besides, zinc vapor is toxic, and harms the health of operators. Adding a small amount of silicon to the silver brazing material outer coat can prevent zinc from volatilizing in the brazing. Since the silicon is prone to volatilization in the brazing, and forms a silicate having a low melting point with a borate in the flux core, the silicate covers the surface of the brazing material that is melted into a liquid state, and prevents zinc from volatilizing.

By adding a certain amount of elemental boron micropowder to the flux core, the flux core has advantages of high activity, strong defilming capability, and so on. Since the elemental boron micropowder disperses in the flux core, after being heated, the boron power can quickly remove oxygen in micro-zones of the brazing seam, and $4B+3O_2 \rightarrow 2B_2O_3$. Boric anhydride can form easy-to-melt borates with oxides of elements copper, iron, zinc, nickel and so on in the brazing material outer coat: $MeO+B_2O_3 \rightarrow MeO.B_2O_3$, and the borates easily float to the surface of the brazing seam, thus improving flowing spreadability of the brazing material. Sodium borohydride reacts with oxygen gas to generate sodium metaborate: $NaBH_4+2O_2 \rightarrow NaBO_2+2H_2O$; sodium metaborate in turn can form a complex compound having a lower melting temperature with borate: $MeO+2NaBO_2+B_2O_3 \rightarrow (NaBO_2)_2.Me(BO_2)_2$, which easily floats to the surface of the brazing seam. Potassium fluoroborate can reduce chromium oxide in the stainless steel. Potassium fluoroborate is decomposed by heating into potassium fluoride and boron trifluoride: $KBF_4 \rightarrow KF+BF_3$. Potassium fluoride can lower the melting point and a surface tension of the flux, and improve the defilming capability; boron trifluoride reacts with chromium oxide: $BF_3+Cr_2O_3 \rightarrow 2CrF_3+B_2O_3$, and boric anhydride can serve a function of aiding flow.

Adding sodium fluoride serves a function of dissolving a base metal and the oxidation film on the surface of the brazing material, and improves the defilming capability. The sodium fluoride has lower hygroscopicity than potassium fluoride, and can effectively prevent the flux-cored silver brazing material from absorbing moisture to peel off. Sodium bifluoride, having a melting point of merely 160° C., can lower the melting point of the flux core, and is decomposed under a high temperature into sodium fluoride and hydrogen fluoride: $NaHF_2 \rightarrow NaF+HF$, and the decomposed components facilitate eliminating oxides.

The copper sulfate added to the flux core in the present disclosure will react after being heated, and will coat a layer of copper film on the surface of the welded metal, and particularly after the copper film is coated on the surface of a metal (for example, stainless steel, manganese brass, and so on) that is hard to braze, it contributes smooth brazing.

Furthermore, the in-situ synthetic metal-coated flux-cored silver brazing material further includes a protection layer formed on an inner surface of the brazing material outer coat. The protection layer can further protect the brazing material outer coat against corrosion by the flux core. As shown in FIG. 2, the protection layer 3 can isolate the flux core 1 from the brazing material outer coat 2. The protection layer 3 can protect the brazing material outer coat 2 against "rusting" caused by corrosion of the intermediate flux core 1, thus improving oxidation resistance and corrosion resistance of the brazing material outer coat 2.

Furthermore, the protection layer is a metal coating that has a melting point lower than that of the brazing material outer coat and that is waterproof.

Furthermore, the protection layer has a thickness of 0.001~0.08 mm.

Furthermore, the protection layer is a tin layer or an indium layer.

Tin or indium, which has relatively low melting points (the melting point of tin is about 232° C., and the melting point of indium is about 156.6° C.), is preferentially melted into a liquid state, then liquid tin wets and spreads (tin has relatively good wettability), and the liquid tin can dissolve the core of the brazing material and can undergo diffusion alloying with the flux core, thus greatly lowering the melting point of the flux core, and improving the flowability and wettability thereof.

A tin or indium layer is firmly bonded with the brazing material outer coat with a good adhesive force, and a coating is intact and distributed uniformly, with fine and tight crystal grains and a lower porosity.

Furthermore, the in-situ synthetic metal-coated flux-cored silver brazing material is in an axially multi-turn spring-shaped structure. Reference can be made to FIG. 1 for a form of the in-situ synthetic metal-coated flux-cored silver brazing material.

Furthermore, the brazing material outer coat of the in-situ synthetic metal-coated flux-cored silver brazing material is a brazing material tube in a tubular shape, and the flux core is filled in the brazing material tube.

Figure 3:
FIG. 3 is a schematic structural diagram of the flux-cored silver brazing material wire.

Furthermore, the brazing material tube has a diameter of 1.8~3.0 mm, and the brazing material tube has a wall thickness of 0.3~0.5 mm. The brazing material tube has a cross section in a circular shape or an oblate shape, and reference can be made to FIG. 2 for the cross section. The axially multi-turn spring-shaped structure is formed by winding the brazing material tube coated over the flux core, and reference can be made to FIG. 3 for a form of the brazing material tube before being wound.

The present embodiment further provides a method for preparing an in-situ synthetic metal-coated flux-cored silver brazing material of the present disclosure, includes:

S1 smelting and pouring various metal elements of a brazing material outer coat into an ingot;

S2 pre-heating the ingot in a temperature condition of 300~550° C. to be processed into a brazing material tube, wherein furthermore, the ingot can be firstly processed into a strip-shaped alloy after being pre-heated, the strip-shaped alloy undergoes a passivation treatment after a surface cleaning treatment. Furthermore, the surface cleaning treatment includes acid pickling and ultrasonic water washing. Then the passivated strip-shaped alloy is oven dried to be processed into the brazing material tube. Furthermore, the oven drying is carried out under a temperature of 100~150° C. for a period of 5~10 min;

S3 coating a protection layer on one surface of the strip-shaped alloy, wherein furthermore, before being processed into the brazing material tube, the strip-shaped alloy is coated with the protection layer on one surface, then the strip-shaped alloy is wound into the brazing material tube, with the protection layer being located on the inner surface of the brazing material tube. The protection layer is a metal coating that has a melting point lower than that of the brazing material outer coat and that is waterproof. Furthermore, the protection layer is a tin layer or an indium layer; furthermore, the protection layer is formed on one surface of the strip-shaped alloy by a spray coating way. In other embodiments, the protection layer also may be coated on all surfaces of the strip-shaped alloy;

S4 winding the strip-shaped alloy coated with the protection layer into a brazing material tube, wherein a side with the protection layer is an inner surface of the brazing material tube;

S5 filling a dried and smashed flux core into the brazing material tube, wherein furthermore, the flux core is dried under 100-120° C. for 240 min or more;

S6 preparing a flux-cored silver brazing material with a desired diameter through rolling or drawing;

S7 winding a flux-cored silver brazing material wire into an axially multi-turn spring-shaped structure.

In some embodiments, at least one of step S2, step S6 or step S7 can be omitted.

The present embodiment further provides a brazing method that uses the in-situ synthetic metal-coated flux-cored silver brazing material of the present disclosure. Furthermore, the brazing is at least one selected from the group consisting of flame brazing, induction brazing, and resistance brazing.

Furthermore, the brazing method includes a step of joining an installing object and a to-be-installed object into one piece using the in-situ synthetic metal-coated flux-cored silver brazing material of the present disclosure; at least one of the installing object and the to-be-installed object is stainless steel or manganese brass pipeline component to be brazed.

The present embodiment further provides a joint body that uses the in-situ synthetic metal-coated flux-cored silver brazing material of the present disclosure, such that an installing object and a to-be-installed object are joined into one piece.

Furthermore, at least one of the installing object and the to-be-installed object is stainless steel or manganese brass pipeline component to be brazed.

Below the present disclosure is further described in combination with specific examples.

Example 1

An in-situ synthetic metal-coated flux-cored silver brazing material provided in the present example has an axially multi-turn spring-shaped structure formed by winding a flux-cored silver brazing material, the flux-cored silver brazing material consists of a flux core 1, a brazing material outer coat 2, and a protection layer 3, wherein the brazing material outer coat 2 is coated on the outside of the flux core 1, and a tin layer is on an inside surface of the brazing material outer coat.

The brazing material outer coat consists of, in percentage by weight, following components:

silver Ag 34%, copper Cu 35.8%, zinc Zn 27%, tin Sn 1.5%, phosphorus P 0.4%, nickel Ni 1%, germanium Ge 0.15%, and lithium Li 0.15%.

The flux core consists of, in percentage by weight, following components: elemental boron micropowder 8%, sodium borohydride 7%, potassium fluoroborate 22%, boric anhydride 33%, sodium fluoride 23%, sodium bifluoride 3%, and copper sulfate 4%.

A method for preparing an in-situ synthetic metal-coated flux-cored silver brazing material of the present example is as follows:

a) proportionally preparing various metal elements required by a brazing material outer coat, and smelting and pouring the metal elements into a brazing material ingot; pre-heating the ingot in a resistance heating furnace at 450° C., placing the already pre-heated ingot into extruding equipment to be extruded, rolling and slitting the ingot into a strip-shaped alloy with a thickness of 0.3~0.5 mm and a width of 7.0~8.5 mm, then performing acid pickling and then ultrasonic (with water) cleaning, subsequently, performing a passivation treatment in a passivating agent, then placing the passivated strip-shaped alloy in a oven of 100~150° C. to be dried for 5~10 min for subsequent use;

b) coating a layer of tin with a thickness of 0.001 mm on a surface of one side of the strip-shaped alloy by a spray coating method;

c) proportionally weighing various raw materials elemental boron micropowder, sodium borohydride, potassium fluoroborate, boric anhydride, sodium fluoride, sodium bifluoride, and copper sulfate and preparing them into a flux core, after even mixing, drying the flux core in a low-vacuum (a vacuum degree of 0 Pa) drying oven of 110° C. for 240 min, cooling, smashing, screening the flux core for subsequent use;

d) winding the prepared strip-shaped brazing material into a brazing material tube (the side coated with the layer of tin being an inner surface of the brazing material tube), adding the prepared flux core into the brazing material tube in the winding process, and preparing a flux-cored silver brazing material with a desired diameter through rolling or drawing;

e) winding the flux-cored silver brazing material into an axially multi-turn spring-shaped structure.

Example 2

For an in-situ synthetic metal-coated flux-cored silver brazing material of the present example, a preparing method and components of a flux core thereof are the same as those of Example 1, while differing in contents of various elements of a brazing material outer coat: silver Ag 25%, copper Cu 39%, zinc Zn 32%, tin Sn 1.75%, phosphorus P 0.5%, nickel Ni 1.5%, germanium Ge 0.1%, and lithium Li 0.15%.

Example 3

For an in-situ synthetic metal-coated flux-cored silver brazing material of the present example, a preparing method and components of a flux core thereof are the same as those of Example 1, while differing in contents of various elements of a brazing material outer coat: silver Ag 30%, copper Cu 35.4%, zinc Zn 31%, tin Sn 1.8%, phosphorus P 0.4%, nickel Ni 1%, germanium Ge 0.2%, and lithium Li 0.2%, and percentages by weight of various components of a flux core: elemental boron micropowder 9%, sodium borohydride 6%, potassium fluoroborate 20%, boric anhydride 35%, sodium fluoride 24%, sodium bifluoride 2%, and copper sulfate 4%.

Example 4

The present example provides a brazing method, including welding two stainless steel tubes into one joint body using the in-situ synthetic metal-coated flux-cored silver brazing material prepared in Example 1. The brazing is induction brazing.

The present example further provides a joint body formed by welding according to the above brazing method.

Comparative Example 1

For a flux-cored silver brazing material of the present example, a preparing method and components of a flux core thereof are the same as those of Example 1, while differing in contents of various elements of a brazing material outer coat: silver Ag 25%, copper Cu 39%, zinc Zn 32%, and tin Sn 1.75%.

Comparative Example 2

For a flux-cored silver brazing material of the present example, a preparing method and components of a flux core thereof are the same as those of Example 1, while differing in contents of various elements of a brazing material outer coat: silver Ag 25%, copper Cu 39%, zinc Zn 32%, tin Sn 1.75%, and phosphorus P 0.5%.

Comparative Example 3

For a flux-cored silver brazing material of the present example, a preparing method and components of a flux core thereof are the same as those of Example 1, while differing in contents of various elements of a brazing material outer coat: silver Ag 25%, copper Cu 39%, zinc Zn 32%, tin Sn 1.75%, phosphorus P 0.5%, nickel Ni 1.5%, and germanium Ge 0.1%.

Test Example

I. "Rusting" Test 100 in-situ synthetic metal-coated flux-cored silver brazing materials, as experiment samples, are respectively prepared using the preparing methods of Examples 1-3; 100 flux-cored silver brazing materials respectively prepared using the preparing methods of Comparative Examples 1-3 serve as control samples.

All of the experiment samples and the control samples are placed in the same salt-spray environment (with a temperature of 35° C., and a concentration of a NaCl aqueous solution of 5%); a length of time from the beginning of the test to the beginning of "rusting" of the samples is recorded, and the storage stability is evaluated on the basis of the length of time.

TABLE 1

Results of Storage Stability of Experiment Samples and Control Samples

|  | Time When Beginning to Rust (day n) |
|---|---|
| Example 1 | 115 |
| Example 2 | 120 |
| Example 3 | 130 |
| Comparative Example 1 | 110 |
| Comparative Example 2 | 112 |
| Comparative Example 3 | 120 |

II. Test for Reliability of Brazing 2.1 Leaking Rate of Welding Seams 100 in-situ synthetic metal-coated flux-cored silver brazing materials, as experiment samples, are respectively prepared using the preparing methods of Examples 1-3; 100 flux-cored silver brazing materials, as control samples, are respectively prepared using the preparing methods of Comparative Examples 1-3.

All of the experiment samples and the control samples are used to braze two stainless steel tubes according to the same induction brazing technology to form one joint body, and 1000 joint bodies are formed by welding with each type of brazing materials. The joint bodies are detected using a helium mass spectrometer leak detecting method to see whether the joint bodies are leaking. The number of the joint bodies that are leaking is recorded to evaluate the leaking rate of the welding seams.

TABLE 2

Results of Leaking Rate of Welding Seams of Experiment Samples and Control Samples

|  | number of joint bodies with welding seams leaking |
|---|---|
| Example 1 | 1 |
| Example 2 | 2 |
| Example 3 | 1 |
| Comparative Example 1 | 5 |
| Comparative Example 2 | 4 |
| Comparative Example 3 | 3 |

2.2 Test for Mechanical Performance 5 in-situ synthetic metal-coated flux-cored silver brazing materials, as experiment samples, are respectively prepared using the preparing methods of Examples 1-3; 5 flux-cored silver brazing materials, as control samples, are respectively prepared using the preparing methods of Comparative Examples 1-3.

All of the experiment samples and the control samples are used to braze two stainless steel plates according to the same induction brazing technology to form a butt joint, and 5 butt joints are formed by welding with each type of brazing materials. Tensile strength of the welded joints is detected using a mechanical tester. Values of the tensile strength of the welded joints are recorded to evaluate the mechanical performance of the welded joints.

TABLE 3

Results of Mechanical Performance of Experiment Samples and Control Samples

|  | tensile strength MPa |
|---|---|
| Example 1 | 370 |
| Example 2 | 375 |
| Example 3 | 380 |
| Comparative Example 1 | 345 |
| Comparative Example 2 | 350 |
| Comparative Example 3 | 370 |

The above-mentioned are merely for preferred embodiments of the present disclosure and not used to limit the present disclosure. For one skilled in the art, various modifications and changes may be made to the present disclosure. Any amendments, equivalent replacements, improvements and so on, within the spirit and principle of the present disclosure, should be covered by the scope of protection of the present disclosure.

INDUSTRIAL APPLICABILITY

The in-situ synthetic metal-coated flux-cored silver brazing material prepared in the present disclosure realizes self-reaction in a brazing process to coat a layer of copper film on a surface of a brazed metal, the core of the brazing material has good wettability, good flowability, self-brazing function, and zinc being hard to volatilize, the flux coat has high activity, low hygroscopicity, few carbon residues, good plasticity and toughness, etc. The present disclosure is particularly suitable for brazing pipeline components of stainless steel, manganese brass and so on.

The invention claimed is:

1. An in-situ synthetic metal-coated flux-cored silver brazing material, comprising a flux core and a brazing material outer coat wrapping the flux core, wherein the brazing material outer coat comprises, in percentage by weight:
   silver Ag 20.0~36.0%, copper Cu 35.0~45.0%, zinc Zn 27.0~37.0%, tin Sn 1.0~3.0%, phosphorus P 0.1%-0.5%, nickel Ni 0.5~2.0%, germanium Ge 0.1~0.3%, and lithium Li 0.1~0.3%, and
   the flux core comprises, in percentage by weight:
   elemental boron micropowder 5.0~10.0%, sodium borohydride 5.0~10.0%, potassium fluoroborate 15.0~30.0%, boric anhydride 25.0~40.0%, sodium fluoride 10.0~30.0%, sodium bifluoride 2.0~4.0%, and copper sulfate 1.0~5.0%.

2. The in-situ synthetic metal-coated flux-cored silver brazing material of claim 1, comprising, in percentage by weight:
   silver Ag 25~35%, copper Cu 35.0~40.0%, zinc Zn 27.0~37.0%, tin Sn 1.5~3.0%, phosphorus P 0.1%-0.4%, nickel Ni 1.0~1.5%, germanium Ge 0.15~0.2%, and lithium Li 0.15~0.2%; and the brazing material outer coat further comprising silicon Si 0.1~0.5%.

3. The in-situ synthetic metal-coated flux-cored silver brazing material of claim 1, further comprising a protection layer formed on an inner surface of the brazing material outer coat.

4. The in-situ synthetic metal-coated flux-cored silver brazing material of claim 1, wherein the protection layer is a metal coating that has a melting point lower than that of the brazing material outer coat and that is waterproof.

5. The in-situ synthetic metal-coated flux-cored silver brazing material of claim 1, wherein the protection layer is a tin layer or an indium layer.

6. The in-situ synthetic metal-coated flux-cored silver brazing material of claim 1, wherein the protection layer has a thickness of 0.001~0.08 mm.

7. The in-situ synthetic metal-coated flux-cored silver brazing material of claim 1, wherein the in-situ synthetic metal-coated flux-cored silver brazing material is in an axially multi-turn spring-shaped structure.

8. A method for preparing the in-situ synthetic metal-coated flux-cored silver brazing material of claim 1, comprising:
   smelting and pouring various metal elements of the brazing material outer coat into an ingot, and after preheating the ingot in a temperature condition of 300~550° C., and processing the ingot into a brazing material tube; and
   filling the flux core after being dried and smashed into the brazing material tube.

9. The preparing method of claim 8, wherein before being filled with the flux core, the brazing material tube undergoes a passivation treatment.

10. The preparing method of claim 8, wherein the ingot is firstly processed into a strip-shaped alloy after being preheated, the strip-shaped alloy undergoes the passivation treatment after a surface cleaning treatment, then the strip-shaped alloy after being passivated is oven-dried to be processed to form the brazing material tube; and the surface cleaning treatment comprises acid pickling and ultrasonic water washing; and the oven-drying is carried out under a temperature of 100~150° C. for a period of 5~10 min.

11. The preparing method of any one of claim 8, wherein before being processed to form the brazing material tube, the strip-shaped alloy is coated with the protection layer on one surface, then the strip-shaped alloy is wound to form the brazing material tube, with the protection layer being located on the inner surface of the brazing material tube; and the protection layer is a metal coating that has a melting point lower than that of the brazing material outer coat and that is waterproof; and the protection layer is a tin layer or an indium layer; and the protection layer is formed on one surface of the strip-shaped alloy in a spray coating way.

12. The in-situ synthetic metal-coated flux-cored silver brazing material of claim 2, further comprising a protection layer formed on an inner surface of the brazing material outer coat.

13. The in-situ synthetic metal-coated flux-cored silver brazing material of claim 12, wherein the protection layer is a metal coating that has a melting point lower than that of the brazing material outer coat and that is waterproof.

14. The in-situ synthetic metal-coated flux-cored silver brazing material of claim 12, wherein the protection layer is a tin layer or an indium layer.

15. The in-situ synthetic metal-coated flux-cored silver brazing material of claim 12, wherein the protection layer has a thickness of 0.001-0.08 mm.

16. The in-situ synthetic metal-coated flux-cored silver brazing material of claim 2, wherein the in-situ synthetic metal-coated flux-cored silver brazing material is in an axially multi-turn spring-shaped structure.

* * * * *